Dec. 16, 1958  A. WEIS  2,864,266
MULTISTAGE DRIVE TRANSMISSION
Filed May 20, 1955  3 Sheets-Sheet 1

Dec. 16, 1958 — A. WEIS — 2,864,266
MULTISTAGE DRIVE TRANSMISSION

Filed May 20, 1955

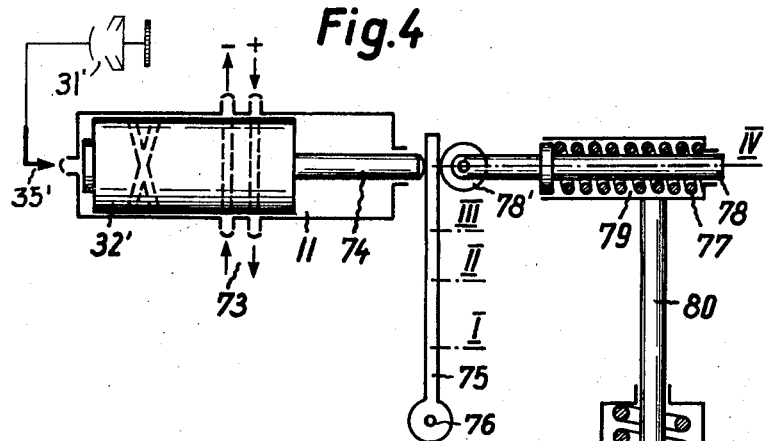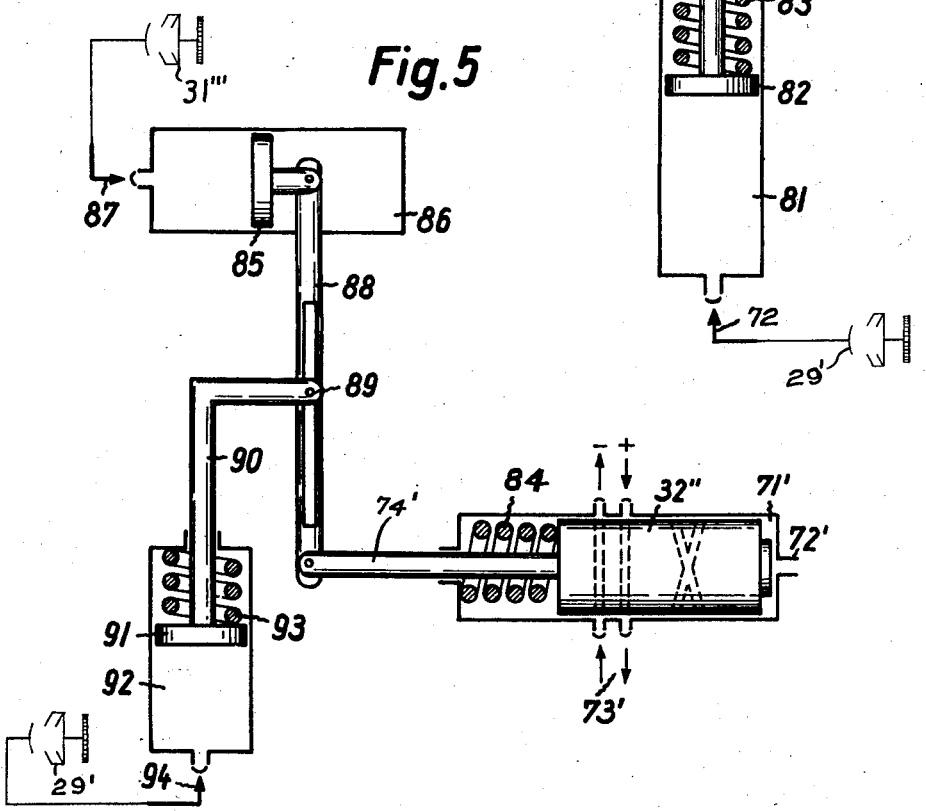

United States Patent Office 2,864,266
Patented Dec. 16, 1958

2,864,266

MULTISTAGE DRIVE TRANSMISSION

Alfred Weis, Olpe, Westphalia, Germany, assignor to Elektro-Mechanik G. m. b. H., Westphalia, Germany Application May 20, 1955, Serial No. 509,921

Claims priority, application Germany May 20, 1949

6 Claims. (Cl. 74—731)

This invention relates to multistage drive transmissions, and more particularly to automatic transmissions for motor vehicles.

Objects of the invention are to provide multistage drive transmissions which include a Foettinger torque converter followed by a plurality of mechanical gear stages including clutches, and control mechanism including an oil pump driven by the turbine of the torque converter for automatically energizing the respective clutches in accordance with the turbine speed. An object is to provide a transmission of the character started in which the torque converter includes a bridging clutch for effecting a direct coupling of the turbine to the converter drive shaft, and the control mechanism effects down-shifting at substantially the same points as the up-shifting in spite of the higher turbine speed when the bridging clutch is engaged.

These and other objects and the advantages of the invention will be apparent from the following specification when taken with the accompanying drawings in which:

Figs. 4 and 5 are schematic diagrams of control arrangements for operating at partial loads and/or speeds of the vehicle.

Figure 1:
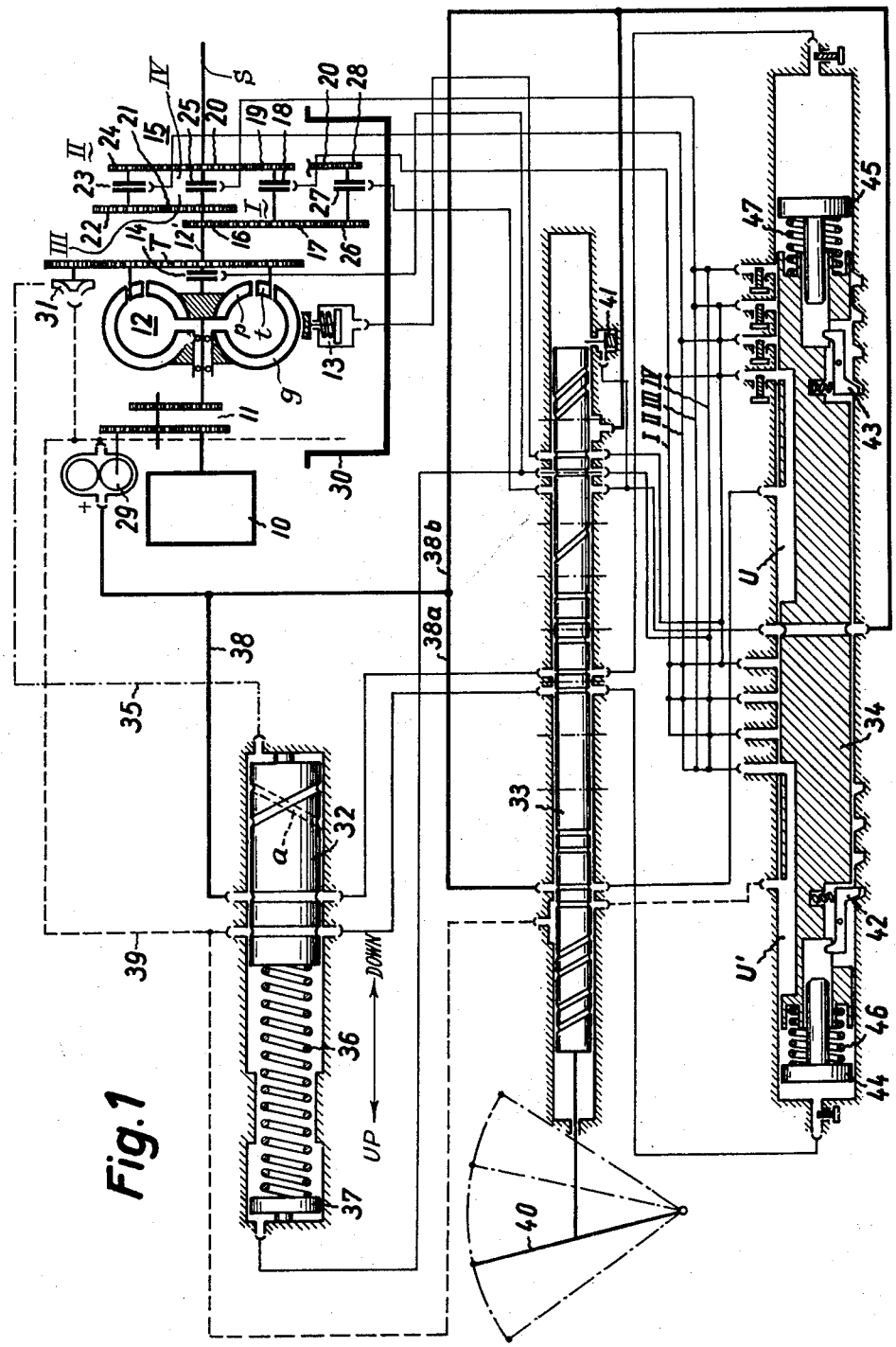
Fig. 1 is a schematic diagram of an embodiment of the invention for use as a vehicle drive.

In Fig. 1, the reference numeral 10 identifies the internal combustion engine which drives through a step-up gear train 11 the pump element $p$ of a Foettinger torque transformer 12 comprising a turbine wheel $t$ and a guide wheel $g$ with which a brake 13 is associated. The turbine $t$ is supported by and drives a gear T fixed on the turbine or driven shaft 12' of the converter. A bridging clutch 14 for a direct mechanical drive of the turbine $t$ is arranged between the pump element $p$ and the turbine frame T. The after-transmission 15 for driving the output shaft S comprises a first forward gear I comprising shaft 12', meshing gears 16, 17, clutch 18 and meshing gears 19, 20; a second forward gear II comprising shaft 12', meshing gears 21, 22, clutch 23 and gear 24; a third forward gear comprising shaft 12' and clutch 25; a mechanical direct drive comprising bridging clutch 14 for coupling frame T to pump $p$ of the converter, and clutch 25. The reverse drive includes shaft 12', gears 16, 17 and 26, clutch 27 and gear 28. The shifting clutches 18, 23, 25 and 27 as well as the bridging clutch 14 are known types of lamellar clutches which are operated by pressure oil delivered by a pump 29 driven by engine 10 through transmission 11. The pressure oil also actuates the guide wheel brake 13 and, in known manner, excess oil from the continuously operating primary pump 29 is returned to reservoir 30 from which it is drawn.

The automatic shifting device consists substantially of a pressure oil pump 29 continuously driven by engine 10 to draw oil from a reservoir 30, a small rotary secondary control pump 31 driven by the turbine frame T, a direction slide 32 controlling the direction of shifting (up or down) which is actuated in dependence of the oil pressure of pump 31, a hand-operated position slide 33 for determining the desired state of driving (idling, forward, reverse, or braking) and the automatic gear slide 34 controlling the various gear trains.

The cylinder of the direction slide 32 is connected at its right front end to the control pressure oil pipe 35 from pump 31, and the position of the slide therefore depends on the speed of the turbine shaft 12' of the torque transformer. The pressure of the control oil is counteracted by a spring 36 whose initial stress can be varied by a piston 37 at the left end of the control cylinder. Pressure oil from pump 29 flows through pipe 38 to a port of the cylinder of slide 32, through branch lines 38$a$ and 38$b$ to ports of the cylinders of slides 33 and 34, respectively. The pipe 39 which is shown in broken line serves to return the shifting pressure oil to reservoir 30.

The position slide 33 can be brought by means of the hand lever 40 into four positions (braking, forward, idling and reverse) and, as shown, is in the forward position. The change from this position into the idling or reverse position is normally blocked by a locking pin 41. This locking pin 41 is maintained in the locking position by a spring and pushed out of this locking position by an oil pressure controlled from the gear slide 34.

The gear slide 34 is designed as a double-action slide, the left end being used to vent oil from the disengaged clutches and the right end for selectively supplying pressure oil to the clutches. Both the up and the down-shifting are controlled by a position stop 42 or 43, which is released by an auxiliary piston 44 or 45 actuated by the oil pressure. When the pressure oil is delivered by the position slide 33 to an end of gear slide 34, the countersprings 46, 47 which bear on the end faces of the slide 34 are tightened so that, when the position stop 42 or 43 is released, the gear slide 34 is pressed suddenly into the next position.

Figure 2:
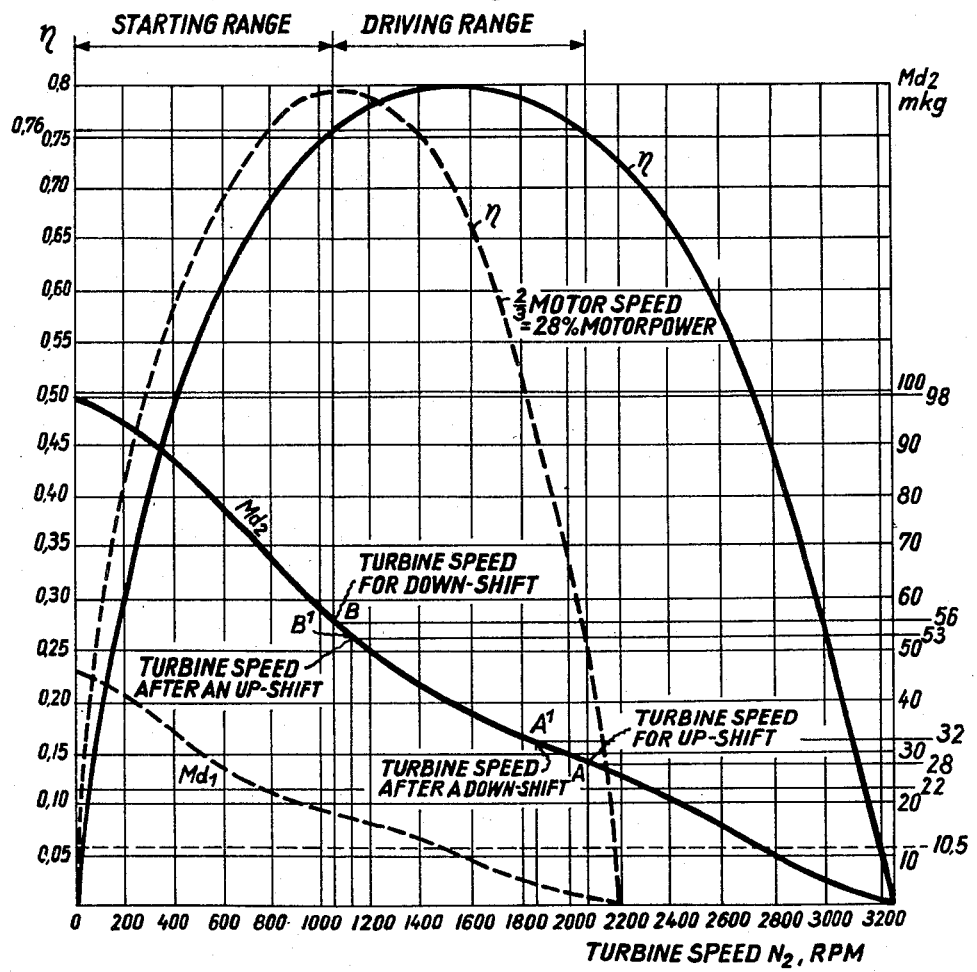
Fig. 2 is a chart of efficiency and torque curves of the hydraulic torque transformer.

In Fig. 2, the solid line curves $\eta$ and $Md_2$ show the variation of torque transformer efficiency and output torque respectively with turbine speed $n_2$ for a constant input speed $n_1$ of the transformer pump element $p$ and a constant input torque $M_1$ in meter-kilometers, and the broken line curves are the corresponding characteristics for the torque transformer when engine 10 is operating at ⅔ top speed and delivering about 28% maximum power.

The starting range extends from zero to point B and the cruising range in the forward gears from B to point A. The points A' and B' are intermediate points which lie between and adjacent the shift points A and B.

(1) Forward drive

For starting, and with the engine idling, the driver sets the shifting lever 40 in the illustrated "forward" position and opens the throttle. The direction slide 32 is then in the illustrated right end position and the gear slide 34 in position to energize clutch 18 of the first gear, and to supply oil to brake 13 to lock the guide wheel $g$ of the converter 12 against rotation. When the car starts, the converter turbine is driven and its torque varies from its maximum according to curve $Md_2$ of Fig. 2. When the developed torque $Md_2$ reaches the point A, the pressure of the control oil output of pump 31 will push the direction slide 32 to the left for a shift to a higher gear. Now the pressure oil can flow from the pump 29 through the pipe 38, the inclined control groove $a$ of the slide 32 to the position slide 33 and from here to the left auxiliary piston 44 of the gear slide 34. The piston 44 is pushed to the right, the stop 42 is released and the gear slide 34 is suddenly brought into the next gear position under the action of the tightened spring 46. In this position of the gear slide 34, the flow of pressure oil through pipe line 38a and slide 33 to chamber U of slide 34 is no longer discharged through line I to clutch 18 of the first gear but through line II to clutch 23 of the second gear step. The turbine wheel $t$ of the torque transformer now operates at the point B′ of the characteristic $Md_2$ since the turbine speed is reduced by the changed mechanical transmission. Control slide 32 is therefore returned to the right by spring 36 and, if the car speed is further accelerated the turbine again increases to the point A where the third gear III is engaged. After the shifting the turbine speed drops back to the point B′. If the driving speed increases further, the fourth gear or direct drive IV is engaged when the point A is again reached. In this gear, pressure oil is directed by gear slide to clutches 14 and 25, to the brake 13 and also to the left end of the cylinder of the slide 32. The impositive drive of the torque transformer is thus bridged by clutch 14 and the guide wheel is free to rotate.

It is to be noted that the turbine $t$ of the torque converter will run at higher speed when clutch 14 is engaged since it is then directly coupled to the pump $p$. Although this results in a higher speed of the control pump 31, it does not alter the shifting points of the gear transmissions since pressure oil from pump 29 is admitted to piston 37 at the left end of the cylinder of slide 32 to reinforce the spring 36 when bridging clutch 14 is engaged.

If the car runs up a slope in direct fourth gear or if it must be braked in front of an obstacle, the speed of the control pump 31 drops with the driving speed. Since in the direct fourth gear engine and turbine are tightly coupled, the direction slide 32 would shift back only when the developed torque decreased to point B, and the speed of the engine would be too low for efficient operation. For this reason the counterspring 36 is prestressed in the direction slide 32 by means of the piston 37 to such extent that, with the direct clutch 14 engaged, the pressure of the oil from control pump 31 will no longer hold slide 32 to the left and it will move back to the illustrated position, thereby admitting pressure oil to the right end of slide 34, and the shift down to drive III is effected at point A′ of the turbine torque curve, and when this shift is made, the engine speed increases again to its nominal value. If the car speed decreases so far that the turbine speed drops to point B, the gear slide 34 jumps then into the second gear position and engages the corresponding clutch 23. Due to the change of the speed reduction, the turbine speed increases again to point A′. If the driving speed decreases further, the first gear I is engaged at point B in the above described manner.

Both with increasing and with decreasing driving speed the shifting is automatically so effected that the torque converter works in the driving range of optimum efficiency. To avoid unnecessary shifting, it is advisable not to let the points A and A′ or B and B′ coincide, otherwise the car would be shifted constantly back and forth at minor speed changes. This means in practice that the efficient operating range of the torque converter must be somewhat larger than the ratio range of the mechanical gear transmissions.

(2) *Braking*

If the driver also wants to use the engine for braking, for example on long slopes, he puts the shifting lever 40 in position "braking." In this position turbine $t$ and pump $p$ of the transformer 12 are to be tightly coupled with the engine 10 in all gears, because the torque converter does not permit of braking moments in the normal operating range. By additional fixing of the guide wheel $g$, the converter acts as a brake and enhances the braking effect of the engine since the braking moment of the converter increases with the square of its speed. If the speed is too high, the driver must brake the car with the foot brake until the speed has dropped to effect a shift to the next lower gear. The drive then continues to shift back since the speed of the control pump 31 has not changed and the direction slide 32 is still in the position "down."

(3) *Idling*

In this position all clutches are disconnected. The locking pin 41 at the right end of the position slide 33 prevents the driver from shifting arbitrarily at high speed into the idling condition. The driving speed must first drop to a value which corresponds to the first gear. This is important, because otherwise the first gear would be engaged automatically, even at high driving speeds, since the speed of the control pump operates at a value corresponding to the first gear even with the engine idling due to the disengagement of all clutches.

(4) *Reverse gear*

In this case the described reverse gear is engaged. The locking pin 41 makes it possible to shift to reverse gear only after the transmission is adjusted from the first gear to idling.

The indicated automatic shifting, in dependence on the turbine speed, applies primarily to a vehicle in full load operation. If much of the driving is to be done with partial load, it is advisable to influence the automatic shifting device in such a way that at the reduced engine speed corresponding to the partial load the shifting points move into the torque transformer transmission range which is most efficient for this partial load. This influencing can be effected preferably in dependence on the primary speed for reducing, for example, in the illustrated hydraulic automatic shifting device, the initial stress of the counter spring 36 of the direction slide 32 by the oil pressure of a rotary pump rotating with the engine speed, to such an extent that the direction slide 32 moves to the "up" position before the transformer pump $p$ reaches the normal speed.

Figure 3:
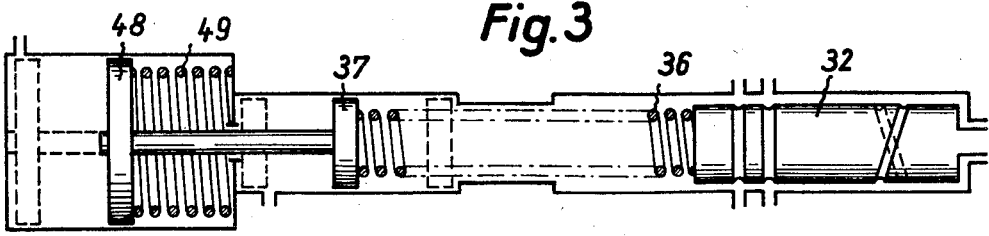
Fig. 3 is a schematic diagram of a modified form of direction slide.

Such an embodiment is represented in Fig. 3. The auxiliary piston 37 is here connected with a second piston 48 which is under pressure of a counterspring 49 at, for example ⅔ of the maximum engine speed when in the position shown in solid lines. The speed-dependence results here from the oil pressure of an additional rotary pump driven with the engine speed, which acts on the piston 48.

As will be apparent from Fig. 3, the initial stress of the spring 36 diminishes with decreasing engine speed so that the direction slide 32 moves sooner to the "up" position than at normal engine speed. The remainder of the shifting apparatus is unchanged. From the broken line curves of Fig. 2 it can be seen that at ⅔ of the engine speed, the optimum efficiency of the torque transformer is shifted into the range of lower speeds. The shifting points are displaced to the left, corresponding to the additional dependence on the engine speed, so that the car always drives, even at partial load, in the speed range with the optimum efficiency.

It is also possible to operate the engine 10 in an optimum speed range for lower partial loads and speeds of the vehicle by providing an automatic variation of the restoring force acting upon the direction or primary control slide. According to this feature of the invention, the converter turbine drives a secondary control pump which delivers pressure oil to the direction slide and a primary control pump driven by the engine delivers pressure oil to a setting piston to vary the force opposing movement of the direction slide by the pressure oil. As shown in Fig. 4, the direction slide 32′ is mounted in a cylinder 71 which has a pipe 35′ (see Fig. 1) connected to one end for the introduction of pressure oil from a secondary control pump 31′ driven by the converter turbine and openings 73 at an intermediate point for connection to the cylinder of a manually operated slide 33, as in Fig. 1. Rod 74 extends axially from slide 32' to bear against a one-armed lever 75 which is pivoted on a pin 76 and a counterspring 77 presses on the opposite side of lever 75 by means of rod 78 and roller 78'. Spring 77 and rod 78 are mounted in a cylinder 79 carried by a piston rod 80 slidable in a cylinder 81 into which pressure oil is introduced at its lower end by pipe 72 from the primary control pump 29. Rod 80 terminates in piston 82 against which spring 83 bears to oppose displacement of the piston, and therefore of cylinder 79 by the pressure oil.

The displacement of cylinder 79 varies the leverage with which spring 77 acts upon the direction slide 32' according to a square law, and the net result is that the gear slide 34, Fig. 1, is so controlled that appropriate shifts of the transmission are made so that the torque converter operates in an efficient range even at partial loads.

In the form shown in Fig. 5, those elements which correspond to elements of Fig. 4 are identified by primed reference numerals but, in general, will not be described in detail. The direction or anticipatory control slide 32" is mounted in cylinder 71' and its displacement to the left in the figure is opposed by a counterspring 84 and is assisted by a piston 85 in cylinder 86 and subject to pressure oil entering by pipe 87 from a secondary control pump 31'''. Piston 85 and rod 74' of slide 32" are connected to opposite ends of a lever 88 which is mounted on a movable pivot pin 89 that extends through a slot in the lever. Pivot pin 89 is carried by the rod 90 of a piston 91 in cylinder 92 where it is subjected to the opposing forces of spring 93 and pressure oil entering by pipe 94 from the primary control pump 29, Fig. 1.

The displacement of the pivot point 89 results in a change of the transmission ratio between the secondary control pressure piston 85 and its counterspring 84 in such a way that with the square decrease of the secondary control pressure the counterforce also decreases with the square in dependence on the primary control pressure. In this way, the speed ratio of the torque transformer pump $p$ and turbine $t$ remains unchanged.

I claim:

1. A multistage drive transmission comprising an engine actuating a Foettinger torque converter having a pump cooperating with a turbine and a guide wheel, a bridging clutch for coupling said pump and turbine, a shaft on which said turbine is mounted, a plurality of gear trains following said turbine shaft, each gear train including an oil-controlled clutch and the highest gear train including said bridging clutch in series with a gear train clutch, a primary pump driven by said engine to supply pressure oil, a secondary control oil pump driven by said turbine, shifting means responsive to the pressure of control oil from said control oil pump for selectively supplying pressure oil to said clutches in accordance with the speed of the turbine, said shifting means including a direction slide slidable in a cylinder, a counterspring adjacent one end of said direction slide biasing said slide in one direction in the cylinder and means responsive to the control oil pressure for displacing said direction slide against the biasing force of said counterspring, and compensating means controlling said shifting means to effect a down-shift from the highest gear train at substantially the turbine speed of the down-shift from the other gear trains.

2. A multistage drive transmission as recited in claim 1, wherein said shifting means further includes a manually operated slide to be positioned in accordance with the desired transmission state, a network of pressure oil lines leading to said clutches, and a gear slide for controlling the flow of pressure oil in said network to and from said clutches; said network including said direction slide in series with said manually operated slide to control the flow of pressure oil to said gear slide and also to automatically control the position of said gear slide in accordance with the speed of the turbine.

3. A multistage transmission as recited in claim 2, wherein said compensating means includes pipe lines of said network for admitting pressure oil to said cylinder to supplement the force of said counterspring simultaneously with the admission of pressure oil to said bridging clutch.

4. A multistage transmission as recited in claim 2, wherein said gear slide is slidable in a cylinder and has spring-pressed pawls at each end thereof normally locking said gear slide against displacement away from the respective ends of the cylinder, the wall of the cylinder having spaced notches in which said pawls engage, pistons at the respective ends of said cylinders for releasing said pawls, said network including pipe lines from said manually operable slide to the respective ends of said cylinder, the pressure oil which actuates a piston to release a pawl then moving the slide to engage the pawl in an adjacent notch.

5. A multistage drive transmission as recited in claim 2, wherein said direction slide has a rod extending axially therefrom, in combination with means for varying the force with which said counterspring opposes displacement of said direction slide by control pressure oil, said means comprising a cylinder carrying said counterspring, a rod pressed by said spring and carrying a roller, a lever having a fixed pivot and a free end bearing against said slide rod, and means responsive to pressure oil from said primary control oil pump for varying the point along said lever at which it is engaged by said roller.

6. A multistage drive transmission as recited in claim 2, wherein said direction slide has a rod extending axially therefrom, in combination with means for varying the force with which said counterspring opposes displacement of said direction slide by control pressure oil, said means comprising a piston in a cylinder and subject to secondary control oil pressure, a lever on a movable fulcrum and having its ends connected respectively to said piston and to the rod of said direction slide, and means responsive to pressure from said primary control oil pump to move the fulcrum of said lever.

References Cited in the file of this patent

UNITED STATES PATENTS

| | | |
|---|---|---|
| 2,690,074 | Livezey | Jan. 11, 1955 |
| 2,707,408 | Ahlen | May 3, 1955 |